United States Patent
Chin et al.

(10) Patent No.: US 9,125,149 B2
(45) Date of Patent: Sep. 1, 2015

(54) METHOD AND APPARATUS FOR ENHANCEMENT OF SYNCHRONIZATION FOR TD-SCDMA BATON HANDOVER

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, AS (US)

( * ) Notice: Subject to any disclaimer, the term of this patent is extended or adjusted under 35 U.S.C. 154(b) by 476 days.

(21) Appl. No.: 13/379,598

(22) PCT Filed: Apr. 7, 2010

(86) PCT No.: PCT/US2010/030190
§ 371 (c)(1),
(2), (4) Date: Dec. 20, 2011

(87) PCT Pub. No.: WO2011/040987
PCT Pub. Date: Apr. 7, 2011

(65) Prior Publication Data
US 2012/0184278 A1  Jul. 19, 2012

Related U.S. Application Data

(60) Provisional application No. 61/247,196, filed on Sep. 30, 2009.

(51) Int. Cl.
*H04W 36/00* (2009.01)
*H04W 56/00* (2009.01)
*H04W 36/18* (2009.01)

(52) U.S. Cl.
CPC .......... *H04W 56/00* (2013.01); *H04W 36/0005* (2013.01); *H04W 36/0072* (2013.01); *H04W 56/001* (2013.01); *H04W 36/0055* (2013.01); *H04W 36/18* (2013.01)

(58) Field of Classification Search
CPC . H04W 56/00; H04W 36/0072; H04W 36/18; H04W 36/0055; H04W 36/0005; H04W 36/30; H04W 36/08; H04W 36/14; H04W 52/40
USPC .......... 455/436–444; 370/332, 280, 465, 329, 370/331, 328, 330, 350, 503, 504, 509, 512
See application file for complete search history.

(56) References Cited

U.S. PATENT DOCUMENTS 7,088,688 B2 * 8/2006 Kim et al. ..................... 370/280
7,295,842 B2 * 11/2007 Yang et al. .................... 455/436

(Continued)

FOREIGN PATENT DOCUMENTS

CN  101473677 A  7/2009

OTHER PUBLICATIONS

International Search Report and Written Opinion—PCT/US2010/030190, International Search Authority—European Patent Office—Jun. 22, 2010.

(Continued)

*Primary Examiner* — Olumide T Ajibade Akonai
(74) *Attorney, Agent, or Firm* — Kristine U. Ekwueme

(57) ABSTRACT

A method and apparatus for wireless communication comprising switching an uplink (UL) from a source cell to a target cell; and receiving a Synchronization Shift (SS) command from the source cell, wherein the SS command is generated by the target cell. In one aspect, the method and apparatus further comprise switching a downlink (DL) through the target cell; completing a physical channel reconfiguration; and sending a Physical Channel Reconfiguration Complete message to the Radio Network Controller (RNC) through the target cell.

40 Claims, 7 Drawing Sheets

(56) References Cited

U.S. PATENT DOCUMENTS

| | | |
|---|---|---|
| 2003/0117980 A1* | 6/2003 | Kim et al. .................... 370/332 |
| 2005/0013277 A1 | 1/2005 | Marque-Pucheu |
| 2006/0166688 A1 | 7/2006 | Sun et al. |
| 2007/0230394 A1* | 10/2007 | Wang et al. .................. 370/328 |
| 2007/0293224 A1 | 12/2007 | Wang et al. |
| 2008/0198800 A1* | 8/2008 | Zhang et al. ................. 370/329 |
| 2008/0267131 A1* | 10/2008 | Kangude et al. .............. 370/331 |
| 2010/0080181 A1* | 4/2010 | Yamada et al. ............... 370/329 |
| 2010/0197308 A1* | 8/2010 | Racz et al. ................... 455/436 |
| 2011/0261833 A1* | 10/2011 | Yang ............................ 370/465 |

OTHER PUBLICATIONS

Taiwan Search Report—TW099110945—TIPO—May 15, 2014.

* cited by examiner

METHOD AND APPARATUS FOR ENHANCEMENT OF SYNCHRONIZATION FOR TD-SCDMA BATON HANDOVER

CROSS-REFERENCE TO RELATED APPLICATION(S)

This application claims the benefit of U.S. Provisional Patent Application No. 61/247,196, entitled "APPARATUS AND METHOD FOR ENHANCEMENT OF SYNCHRONIZATION FOR TD-SCDMA BATON HANDOVER", filed on Sep. 30, 2009, which is expressly incorporated by reference herein in its entirety.

BACKGROUND

1. Field

Aspects of the present disclosure relate generally to wireless communication systems, and more particularly, to enhancement of synchronization for Time Division Synchronous Code Division Multiple Access (TD-SCDMA) baton handover.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method of wireless communication comprising switching an uplink (UL) from a source cell to a target cell; and receiving a Synchronization Shift (SS) command from the source cell, wherein the SS command is generated by the target cell.

In an aspect of the disclosure, an apparatus for wireless communication comprising means for switching an uplink (UL) from a source cell to a target cell; and means for receiving a Synchronization Shift (SS) command from the source cell, wherein the SS command is generated by the target cell.

In an aspect of the disclosure, a computer program product, comprising a computer-readable medium comprising code for: switching an uplink (UL) from a source cell to a target cell; and receiving a Synchronization Shift (SS) command from the source cell, wherein the SS command is generated by the target cell.

In an aspect of the disclosure, an apparatus for wireless communication, comprising at least one processor; and a memory coupled to the at least one processor, wherein the at least one processor is configured to: switch an uplink (UL) from a source cell to a target cell; and receive a Synchronization Shift (SS) command from the source cell, wherein the SS command is generated by the target cell.

Advantages of the present disclosure may include an improved scheme for uplink synchronization during TD-SCDMA baton handover which supports closed-loop uplink synchronization in performing baton handover. Additionally, it may provide a better timing synchronization and can improve data transmission reliability during baton handover.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
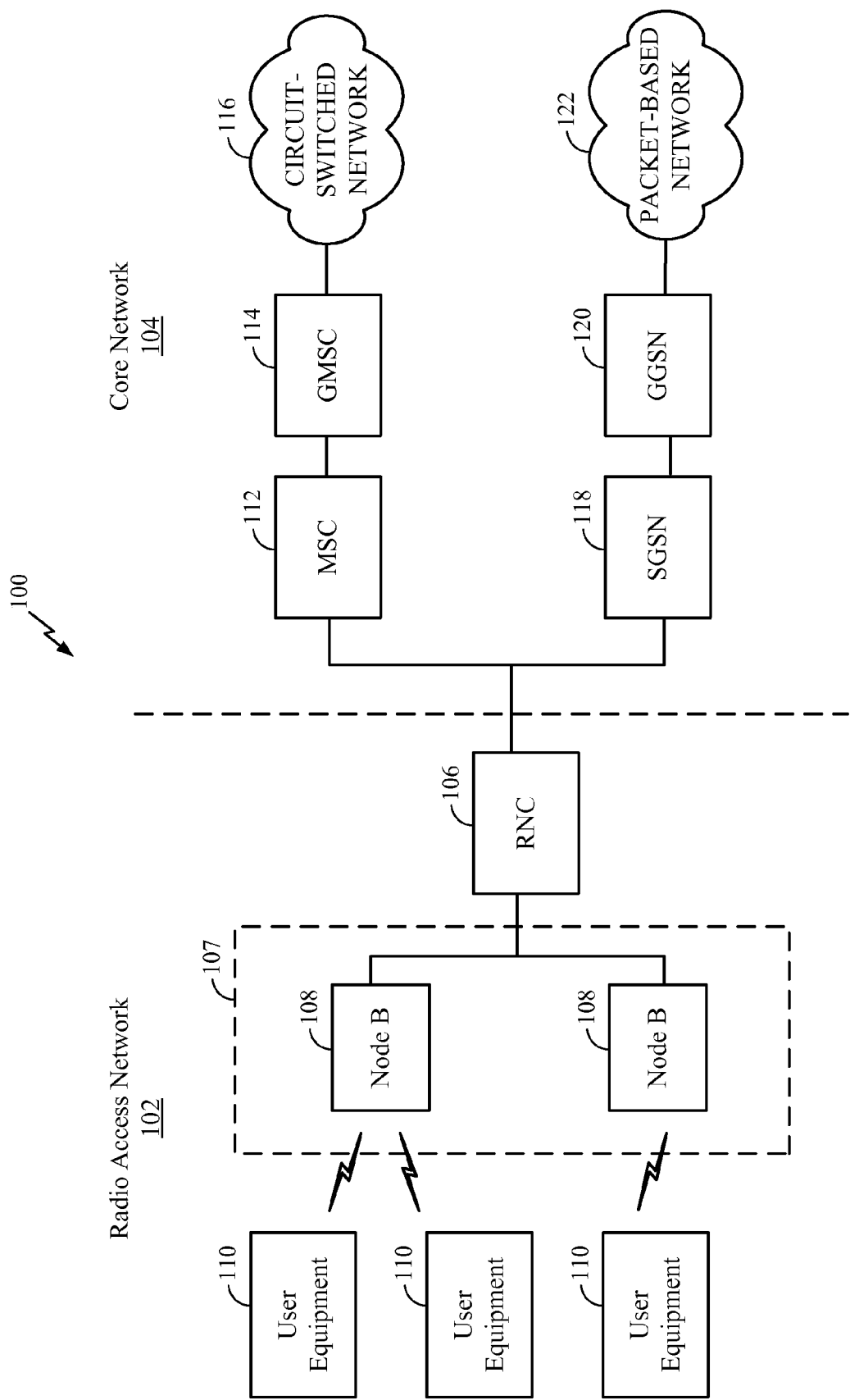
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B. The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
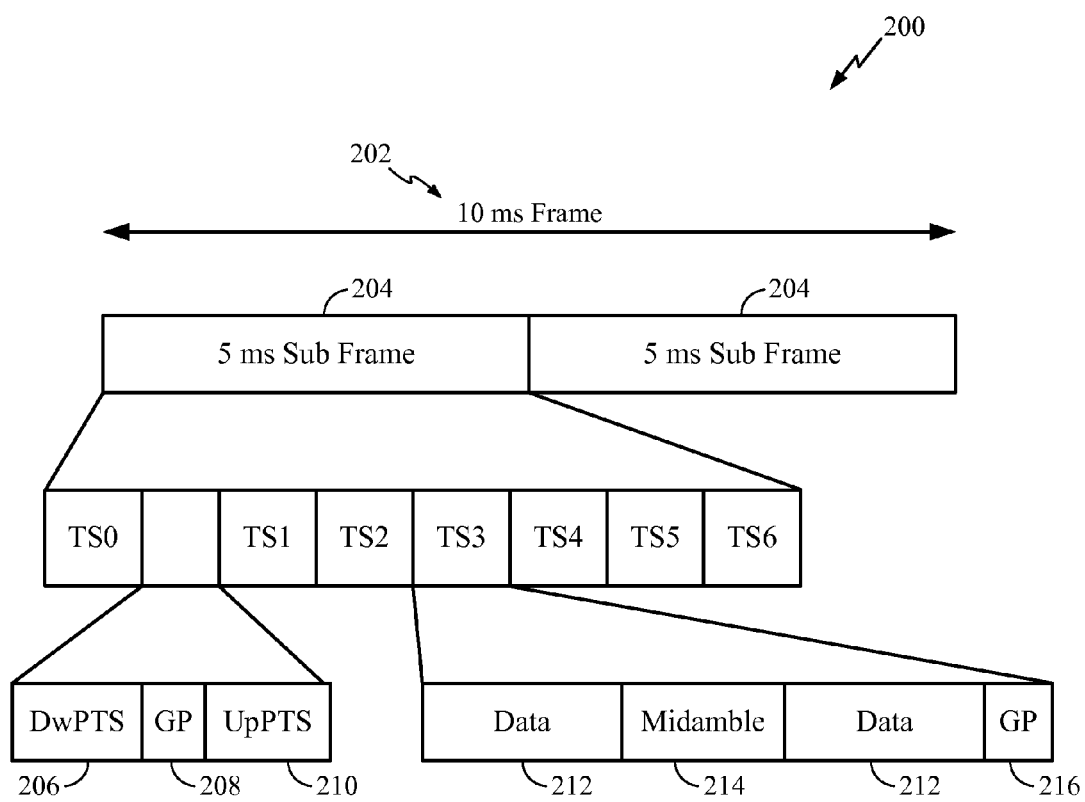
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. In one aspect, the location of a synchronization shift field (not shown) is between the data and the midamble within the time slot.

Figure 3:
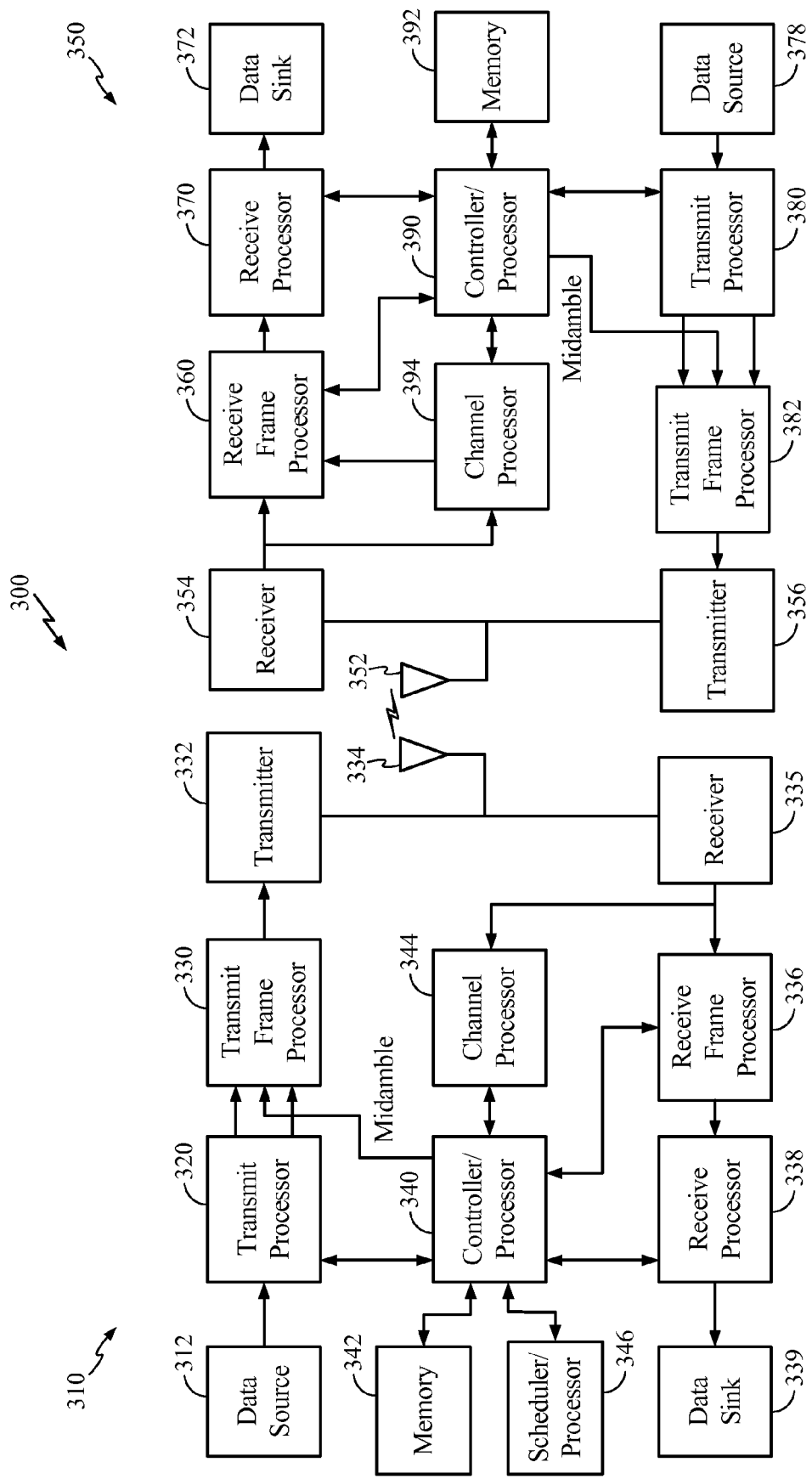
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

An important protocol for wireless communication systems relates to cell handover, which is the transfer of wireless connections from one cell, known as the source cell, to another cell, known as the target cell. Several types of handover may be employed, for example, hard handover, soft handover, and baton handover. A hard handover is also known as a "break-before-make" handover, which means that the first connection between the mobile station and the source cell is broken before the second connection between the mobile station and the target cell is made. A soft handover is also known as a "make-before-break" handover, where the first connection is maintained and not broken until the second connection is made. A baton handover is an intermediate case. The UE first switches the uplink path to the target cell, where initial synchronization is performed prior to handover to minimize the transition time. Then the UE switches the downlink path to the target cell.

TD-SCDMA is one of three options for third generation (3G) cellular networks. TD-SCDMA uses both time division and code division to allow multiple mobile stations, also known as user equipment (UE), to share the same allocated radio bandwidth. The downlink and uplink transmissions also share the same bandwidth with different time slots using time division duplexing (TDD). In this context, duplexing refers to the two directions of communications between the base station and the UE, downlink and uplink. In TD-SCDMA protocols, different UEs synchronize their uplink channels such that all transmissions from the UEs arrive at the base station at essentially the same time.

To maintain the uplink synchronization, the base station, also known as access node or Node B, continues to measure the received signal and transmits a timing correction. For example, the Node B can measure the received midamble of the slot and transmit a Synchronization Shift (SS) command in the Dedicated Physical Channel (DPCH).

One feature of TD-SCDMA is the baton handover. During the baton handover, the UE can achieve the initial uplink synchronization using the open-loop measurement. For example, the UE can measure the timing of the Downlink Pilot Time Slot (DwPTS) of the target Node B. If the DwPTS is observed with more delay, then the UE can advance the uplink synchronization timing further. Upon receiving the PHYSICAL CHANNEL RECONFIGURATION message from the source Node B, the UE first switches the uplink to target Node B which can acquire the uplink and measurement timing correction. Then the UE switches the downlink to the target Node B. Normally, the UE can only receive from one Node B at one time, i.e. in a single receive configuration, and the timing correction can only be sent by the target Node B after the UE switches the downlink to the target Node B which can transmit the Synchronization Shift (SS) in the Dedicated Physical Channel (DPCH).

However, since the baton handover can last, for example, a few hundred milliseconds, the uplink path may not be able to maintain continuous synchronization control. This situation may deteriorate the uplink communication performance, for example, in terms of a larger intra-cell interference level or higher block error rate.

Figure 4:
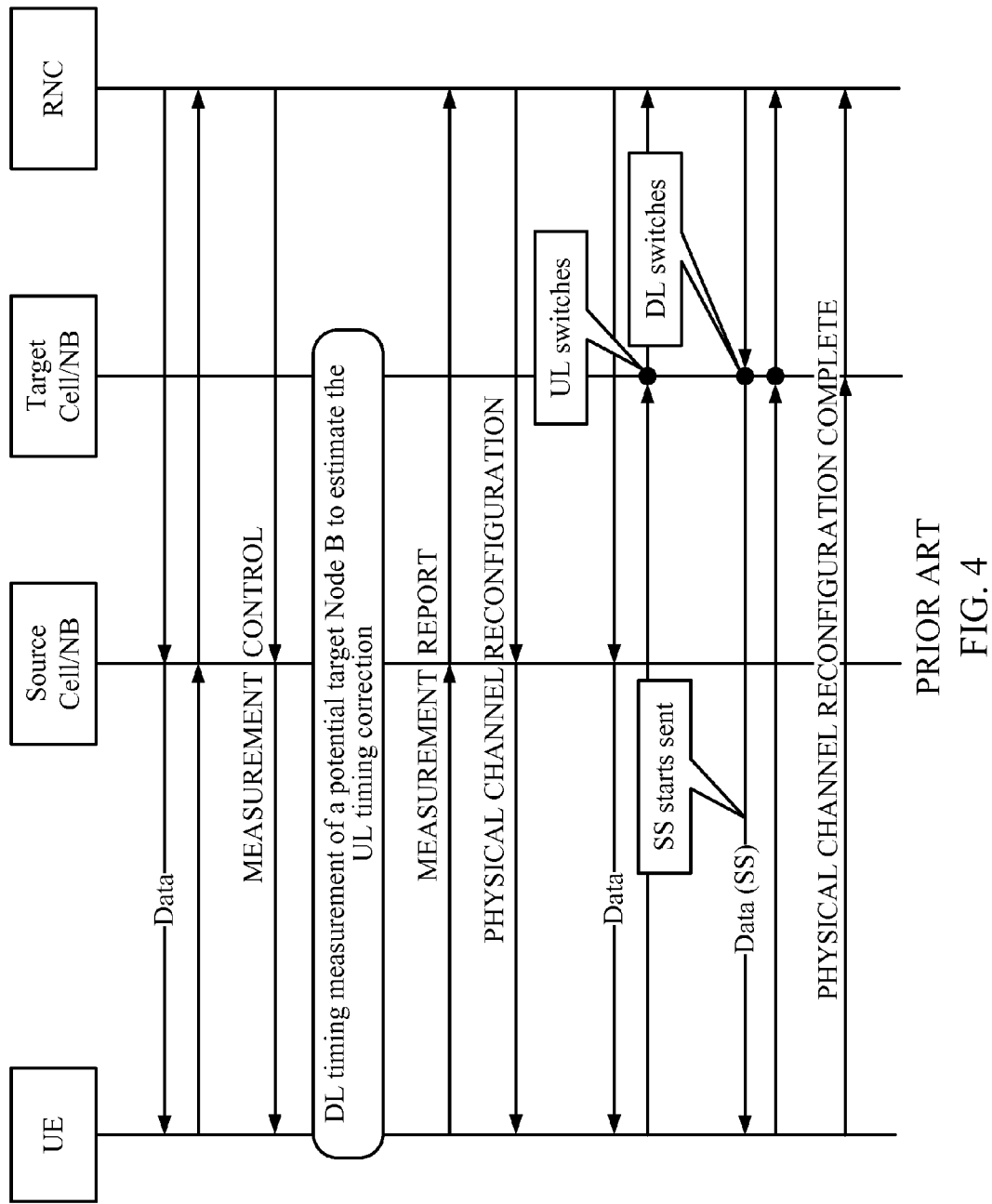
FIG. 4 is a flow diagram conceptually illustrating an example of a baton handover and uplink synchronization process.

FIG. 4 is a flow diagram conceptually illustrating an example of a baton handover and uplink synchronization process. In one aspect the UE performs a downlink timing measurement of a potential target Node B to estimate the uplink timing correction. However, the baton handover can last, for example, a few hundred milliseconds while the uplink may not be able to maintain continuous synchronization control. This problem may deteriorate the uplink performance, for example, in terms of larger intra-cell interference or a higher block error rate.

Shown in FIG. 4, data flows between the UE and the Radio Network Controller (RNC). Measurement Control is sent from the RNC to the UE through the source cell. DL timing measurement of a potential target cell is made to estimate the UL timing correction. Measurement Report is sent from the UE to the RNC through the source cell. Physical Channel Reconfiguration is sent from the RNC to the UE through the source cell. The UE first switches UL to the target cell. UL data is transmitted via the target cell to the RNC and DL data is transmitted via the source cell to the UE. The RNC in turn switches DL later to the target cell and then to the UE, and then Synchronization Shift (SS) command can start to be sent via the target cell to the UE. Once the Physical Channel Reconfiguration is completed, the UE sends a Physical Channel Reconfiguration Complete message through the target cell to the RNC.

In accordance with the present disclosure, an improved closed-loop synchronization control procedure in TD-SCDMA baton handover is disclosed. Two cases of interest are: (a) source cell and target cell are in the same Node B; (b) source cell and target cell are in different Node Bs but have the same Radio Network Controller (RNC).

Figure 5:
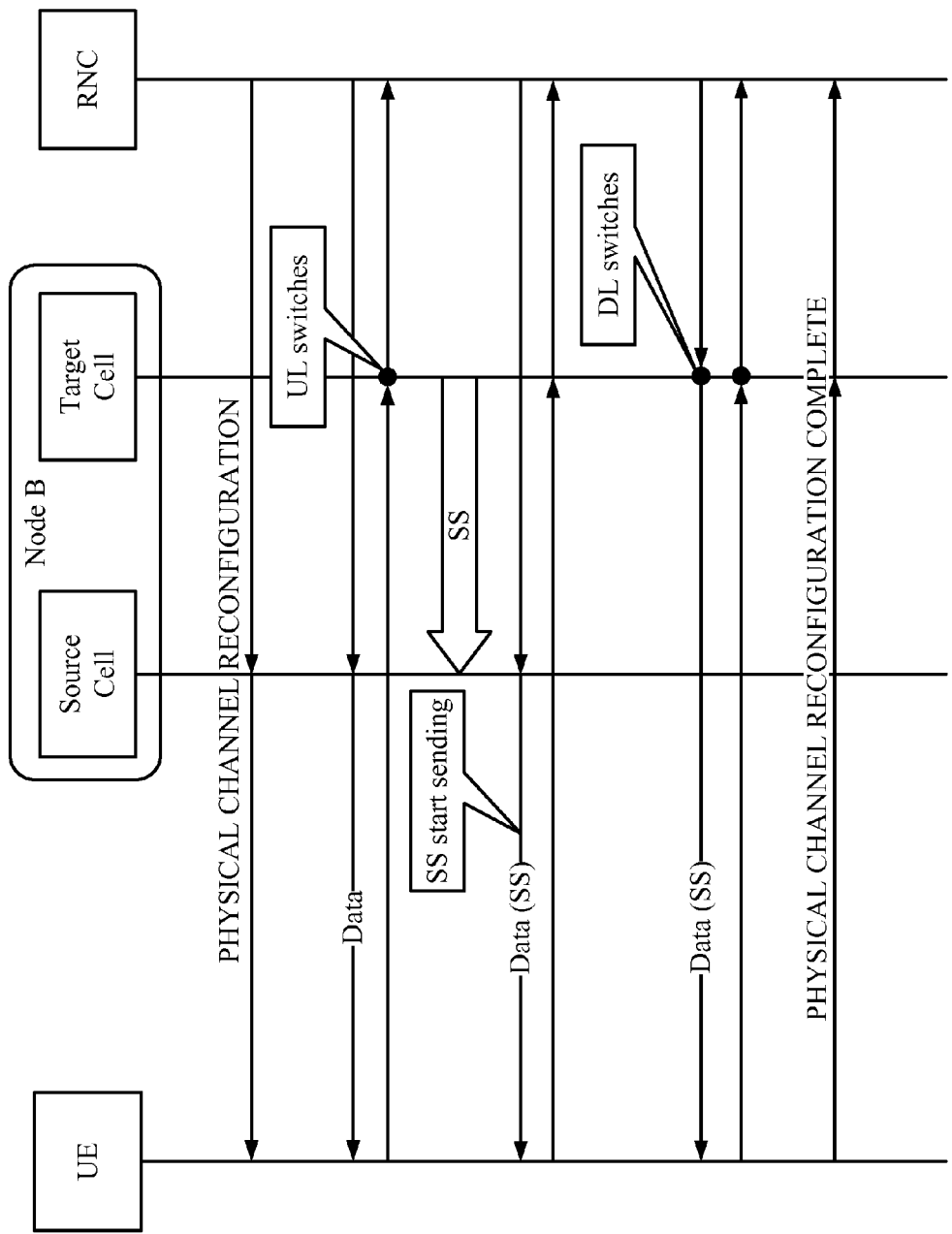
FIG. 5 is a flow diagram conceptually illustrating an example of a closed-loop synchronization control procedure in TD-SCDMA baton handover where the source cell and target cell are in the same base station.

FIG. 5 is a flow diagram conceptually illustrating an example of a closed-loop synchronization control procedure in TD-SCDMA baton handover where the source cell and target cell are in the same base station. In one example, the source cell and the target cell are part of a UTRAN (UMTS Terrestrial Radio Access Network) wherein the base station is a Node B. In FIG. 5, the target cell continues to measure the uplink midamble, and it calculates the timing correction when the baton handover starts. The timing correction is calculated and converted into the Synchronization Shift (SS) command. Then, the target cell forwards the SS command to the source cell whenever new SS information is available. This transmission is easily enabled since both cells (source cell and target cell) are contained within the same Node B. Next, the source cell transmits the received SS command to the UE. The procedure halts when the UE switches the downlink to the target cell. The SS command can then be transmitted by the target cell.

Shown in FIG. 5, a Physical Channel Reconfiguration message is sent by the RNC through the source cell to the UE. Similarly, data is sent by the RNC through the source cell to the UE. The UL switch is initiated first by the UE, sent to the target cell and to the RNC. The Synchronization Shift (SS) command is sent by the target cell to the UE via the source cell. And, SS start sending begins. FIG. 5 shows that uplink data is exchanged between the UE and the RNC through the target cell. At this point, downlink data is exchanged between the UE and the RNC through the source cell. Subsequently, the DL switch is initiated by the network. At this point, the both uplink data and downlink data are then exchanged between the UE and the RNC through the target cell. Once the Physical Channel Reconfiguration is completed, the UE sends a Physical Channel Reconfiguration Complete message through the target cell to the RNC.

Figure 6:
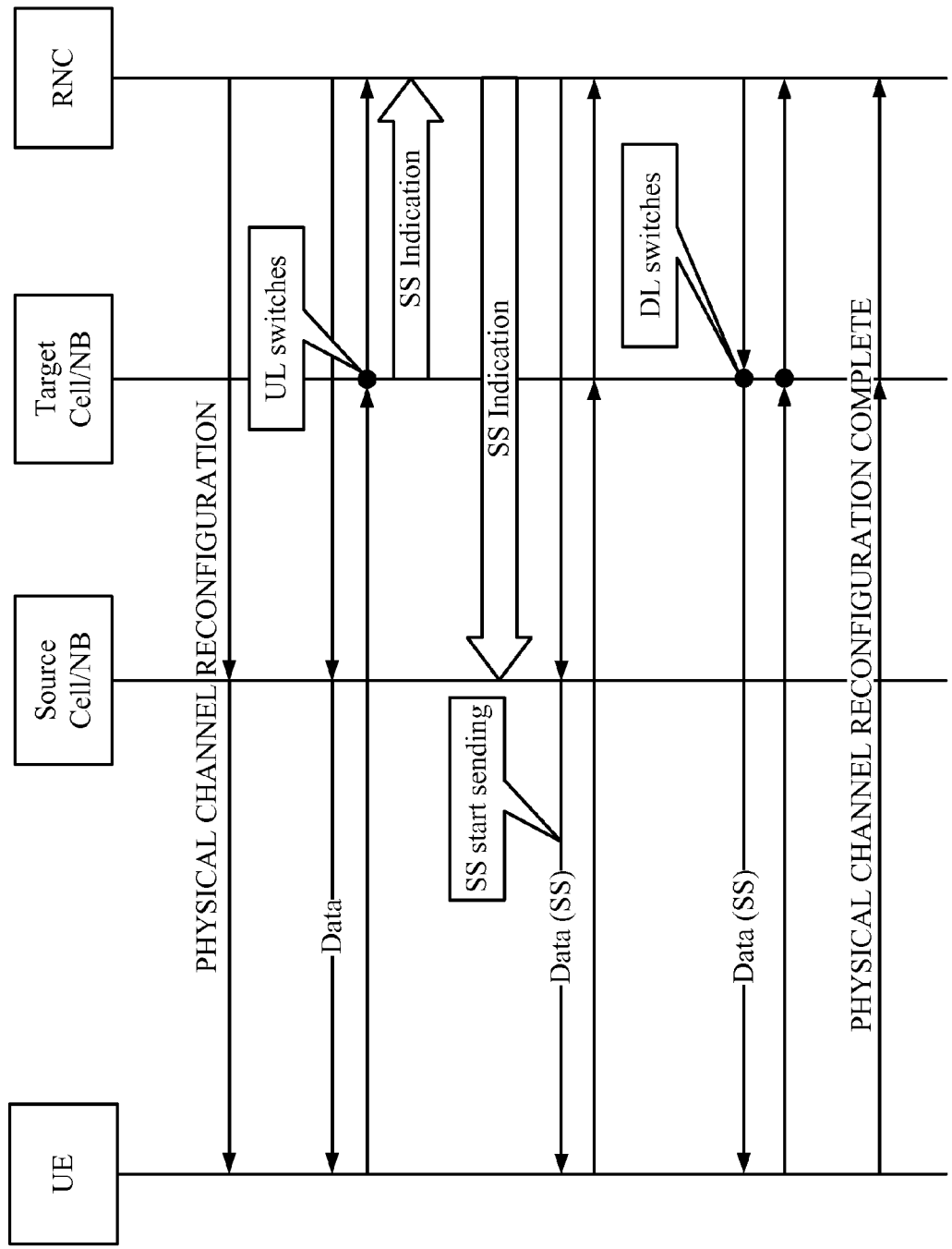
FIG. 6 is a flow diagram conceptually illustrating an example of a closed-loop synchronization control procedure in TD-SCDMA baton handover where the source cell and target cell are in different base stations.

FIG. 6 is a flow diagram conceptually illustrating an example of a closed-loop synchronization control procedure in TD-SCDMA baton handover where the source cell and target cell are in different base stations (e.g., different Node Bs). In FIG. 6, the target cell continues to measure the uplink midamble, and it calculates the timing correction when the baton handover starts. The timing correction is converted into the Synchronization Shift (SS) command. Then, the target cell forwards the SS command using the SS Indication message to the Radio Network Controller (RNC) whenever new SS information is available. This step is required because the source cell and target cell are in different Node Bs. Therefore, the SS information has to be transmitted through the network interface using a new message. In one example, the network interface is known as the Iub interface, which connects the RNC with the Node B. Next, the RNC sends the SS command to the source cell using a new Iub SS Indication message. The source cell includes the SS command in the DPCH transmission of the UE in baton handover. The procedure halts when the UE switches to the downlink. Then, the SS command can be transmitted by the target cell.

Shown in FIG. 6, a Physical Channel Reconfiguration message is sent by the RNC through the source cell to the UE. Similarly, data is sent by the RNC through the source cell to the UE. The UL switch is initiated first by the UE, sent to the target cell and to the RNC. The Synchronization Shift (SS) indication is sent by the target cell to the RNC. And, a Synchronization Shift (SS) indication is returned by the RNC to the source cell. SS start sending begins. FIG. 6 shows that uplink data is exchanged between the UE and the RNC through the target cell. Downlink data from the RNC is sent through the source cell while uplink data sent by the UE is sent through the target cell. Subsequently, the DL switch is initiated by the network. Once the DL switch is also initiated, both uplink data and downlink data being exchanged between the UE and the RNC are through the target cell. Once the Physical Channel Reconfiguration is completed, the UE sends a Physical Channel Reconfiguration Complete message through the target cell to the RNC.

Figure 7:
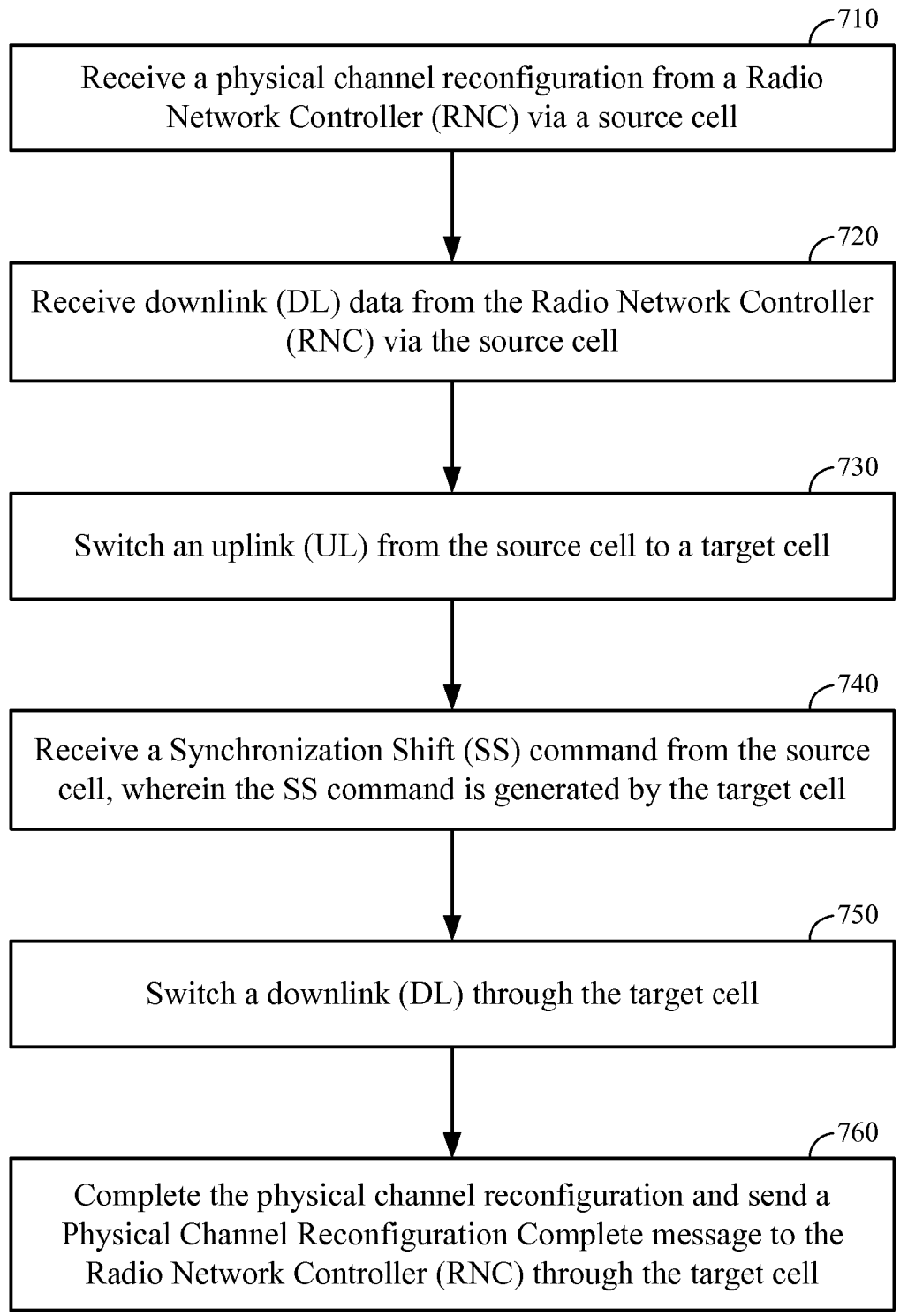
FIG. 7 is a functional block diagram conceptually illustrating example blocks executed to implement the functional characteristics of one aspect of the present disclosure.

FIG. 7 is a functional block diagram illustrating example blocks executed in conducting wireless communication according to one aspect of the present disclosure. In block 710, receive a physical channel reconfiguration from a Radio Network Controller (RNC) via a source cell. In addition, in block 720, receive downlink (DL) data from the RNC via the source cell. Furthermore, in block 730, switch an uplink (UL) from the source cell to a target cell. Furthermore, in block 740, receive a Synchronization Shift (SS) command from the source cell, wherein the SS command is generated by the target cell. In one aspect, the target cell and the source cell are associated with a same base station. In this example, the SS command, which is generated by the target cell, is sent from the target cell to the source cell. In one example, the base station is a Node B, and the source cell and the target cell are part of a UMTS Terrestrial Radio Access Network (UTRAN). In another aspect, the target cell and the source cell are not associated with the same base station. In this example, the target cell which generates the SS command, sends (i.e., forwards) the SS command to the RNC. The RNC in turn sends (i.e., forwards) the SS command to the source cell. And, the source cell then sends (i.e., forwards) the SS command to the UE. In one example, the source cell associated with one base station (e.g., one Node B) and the target cell is associated with a different base station (e.g., a different Node B). In one example, both the source cell and the target cell are part of a UMTS Terrestrial Radio Access Network (UTRAN). In one example, timing correction of the start of a baton handover is calculated by the target cell and converted into the Synchronization Shift (SS) command. In one example, the Synchronization Shift (SS) command is based on a Synchronization Shift (SS) indication message originated from the target cell. For example, the target cell sends the SS command to the RNC using the SS indication message. In one example, the Synchronization Shift (SS) indication message is transmitted over an Iub interface, for example, from the RNC to the source cell. Furthermore, in block 750, switch a downlink (DL) through the target cell. Furthermore, in block 760, complete the physical channel reconfiguration and send a Physical Channel Reconfiguration Complete message to the Radio Network Controller (RNC) through the target cell.

In one aspect, the example synchronization control procedures illustrated in FIGS. 5, 6 and 7 are executed by the controller/processor 390 of the UE 350 illustrated in FIG. 3. In one example, the execution of the synchronization control procedures may be implemented by the controller/processor 390 in conjunction with one or more of the other components illustrated in FIG. 3.

In one configuration, the UE 350, as illustrated in FIG. 3, for wireless communication includes means for receiving a physical channel reconfiguration from a Radio Network Controller (RNC) via a source cell; means for receiving downlink (DL) data from the RNC via the source cell; means for switching an uplink (UL) from the source cell to a target cell; means for receiving a Synchronization Shift (SS) command from the source cell, wherein the SS command is generated by the target cell; means for switching a downlink (DL) through the target cell; means for completing the physical channel reconfiguration and sending a Physical Channel Reconfiguration Complete message to the Radio Network Controller (RNC) through the target cell.

In one aspect, the aforementioned means may be the controller/processor 390 of the UE 350 illustrated in FIG. 3 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication for Time Division Synchronous Code Division Multiple Access (TD-SCDMA) baton handover comprising:
   switching an uplink (UL) from a source cell to a target cell at a first time;
   receiving a Synchronization Shift (SS) command from the source cell at a second time, wherein the SS command is generated by the target cell; and
   switching a downlink (DL) from the source cell to the target cell at a third time,
   in which the first time is before the second time and the second time is before the third time.

2. The method of claim 1 further comprising:
   completing a physical channel reconfiguration.

3. The method of claim 2 further comprising sending a Physical Channel Reconfiguration Complete message to the Radio Network Controller (RNC) through the target cell.

4. The method of claim 2 wherein the target cell and the source cell are associated with a base station and the Synchronization Shift (SS) command is sent from the target cell to the source cell prior to being received.

5. The method of claim 4 wherein the base station is a Node B, and the source cell and the target cell are part of a UMTS Terrestrial Radio Access Network (UTRAN).

6. The method of claim 2 wherein the target cell is associated with a first base station and the source cell is associated with a second base station, and wherein the first base station is not the same as the second base station.

7. The method of claim 6 wherein the first base station and the second base station are part of a UMTS Terrestrial Radio Access Network (UTRAN).

8. The method of claim 7 wherein the Synchronization Shift (SS) command is forwarded by the target cell to the Radio Network Controller (RNC) and the RNC in turn forwards the Synchronization Shift (SS) command to the source cell prior to being received.

9. The method of claim 1 wherein timing correction of the start of a baton handover is calculated by the target cell and converted into the Synchronization Shift (SS) command.

10. The method of claim 9 wherein the Synchronization Shift (SS) command is based on a Synchronization Shift (SS) indication message originated from the target cell and transmitted over an Iub interface.

11. An apparatus for wireless communication for Time Division Synchronous Code Division Multiple Access (TD-SCDMA) baton handover comprising:
    means for switching an uplink (UL) from a source cell to a target cell at a first time;
    means for receiving a Synchronization Shift (SS) command from the source cell at a second time, wherein the SS command is generated by the target cell; and
    means for switching a downlink (DL) from the source cell to the target cell at a third time,
    in which the first time is before the second time and the second time is before the third time.

12. The apparatus of claim 11 further comprising:
    means for completing a physical channel reconfiguration.

13. The apparatus of claim 12 further comprising means for sending a Physical Channel Reconfiguration Complete message to the Radio Network Controller (RNC) through the target cell.

14. The apparatus of claim 12 wherein the target cell and the source cell are associated with a base station and the Synchronization Shift (SS) command is sent from the target cell to the source cell prior to being received.

15. The apparatus of claim 14 wherein the base station is a Node B, and the source cell and the target cell are part of a UMTS Terrestrial Radio Access Network (UTRAN).

16. The apparatus of claim 12 wherein the target cell is associated with a first base station and the source cell is associated with a second base station, and wherein the first base station is not the same as the second base station.

17. The apparatus of claim 16 wherein the first base station and the second base station are part of a UMTS Terrestrial Radio Access Network (UTRAN).

18. The apparatus of claim 17 wherein the Synchronization Shift (SS) command is forwarded by the target cell to the Radio Network Controller (RNC) and the RNC in turn forwards the Synchronization Shift (SS) command to the source cell prior to being received.

19. The apparatus of claim 11 wherein timing correction of the start of a baton handover is calculated by the target cell and converted into the Synchronization Shift (SS) command.

20. The apparatus of claim 19 wherein the Synchronization Shift (SS) command is based on a Synchronization Shift (SS) indication message originated from the target cell and transmitted over an Iub interface.

21. A computer program product for Time Division Synchronous Code Division Multiple Access (TD-SCDMA) baton handover, comprising:
    a non-transitory computer-readable medium comprising code for:

switching an uplink (UL) from a source cell to a target cell at a first time;

receiving a Synchronization Shift (SS) command from the source cell at a second time, wherein the SS command is generated by the target cell; and switching a downlink (DL) from the source cell to the target cell at a third time, in which the first time is before the second time and the second time is before the third time.

22. The computer program product of claim 21 further comprising code for:

completing a physical channel reconfiguration.

23. The computer program product of claim 22 further comprising code for sending a Physical Channel Reconfiguration Complete message to the Radio Network Controller (RNC) through the target cell.

24. The computer program product of claim 22 wherein the target cell and the source cell are associated with a base station and the Synchronization Shift (SS) command is sent from the target cell to the source cell prior to being received.

25. The computer program product of claim 24 wherein the base station is a Node B, and the source cell and the target cell are part of a UMTS Terrestrial Radio Access Network (UTRAN).

26. The computer program product of claim 22 wherein the target cell is associated with a first base station and the source cell is associated with a second base station, and wherein the first base station is not the same as the second base station.

27. The computer program product of claim 26 wherein the first base station and the second base station are part of a UMTS Terrestrial Radio Access Network (UTRAN).

28. The computer program product of claim 27 wherein the Synchronization Shift (SS) command is forwarded by the target cell to the Radio Network Controller (RNC) and the RNC in turn forwards the Synchronization Shift (SS) command to the source cell prior to being received.

29. The computer program product of claim 21 wherein timing correction of the start of a baton handover is calculated by the target cell and converted into the Synchronization Shift (SS) command.

30. The computer program product of claim 29 wherein the Synchronization Shift (SS) command is based on a Synchronization Shift (SS) indication message originated from the target cell and transmitted over an Iub interface.

31. An apparatus for wireless communication for Time Division Synchronous Code Division Multiple Access (TD-SCDMA) baton handover, comprising:

at least one processor; and a memory coupled to the at least one processor, wherein the at least one processor is configured to:

switch an uplink (UL) from a source cell to a target cell at a first time; and receive a Synchronization Shift (SS) command from the source cell at a second time, wherein the SS command is generated and forwarded to the source cell by the target cell; and switch a downlink (DL) from the source cell to the target cell at a third time, in which the first time is before the second time and the second time is before the third time.

32. The apparatus of claim 31 wherein the at least one processor is further configured to:

complete a physical channel reconfiguration.

33. The apparatus of claim 32 wherein the at least one processor is further configured to send a Physical Channel Reconfiguration Complete message to the Radio Network Controller (RNC) through the target cell.

34. The apparatus of claim 32 wherein the target cell and the source cell are associated with a base station and the Synchronization Shift (SS) command is sent from the target cell to the source cell prior to being received.

35. The apparatus of claim 34 wherein the base station is a Node B, and the source cell and the target cell are part of a UMTS Terrestrial Radio Access Network (UTRAN).

36. The apparatus of claim 32 wherein the target cell is associated with a first base station and the source cell is associated with a second base station, and wherein the first base station is not the same as the second base station.

37. The apparatus of claim 36 wherein the first base station and the second base station are part of a UMTS Terrestrial Radio Access Network (UTRAN).

38. The apparatus of claim 37 wherein the Synchronization Shift (SS) command is forwarded by the target cell to the Radio Network Controller (RNC) and the RNC in turn forwards the Synchronization Shift (SS) command to the source cell prior to being received.

39. The apparatus of claim 31 wherein timing correction of the start of a baton handover is calculated by the target cell and converted into the Synchronization Shift (SS) command.

40. The apparatus of claim 39 wherein the Synchronization Shift (SS) command is based on a Synchronization Shift (SS) indication message originated from the target cell and transmitted over an Iub interface.

* * * * *